United States Patent
Strolle et al.

(10) Patent No.: US 6,970,523 B2
(45) Date of Patent: Nov. 29, 2005

(54) DIVERSITY RECEIVER WITH JOINT AUTOMATIC GAIN CONTROL SIGNAL PROCESSING

(75) Inventors: Christopher H Strolle, Glenside, PA (US); Anand M Shah, Pendel, PA (US); Thomas J Endres, Pipersville, PA (US); Samir N Hulyalkar, Plainsboro, NJ (US); Troy A Schaffer, Newtown, PA (US)

(73) Assignee: ATI Technologies, Inc., Ontario (CA)

( * ) Notice: Subject to any disclaimer, the term of this patent is extended or adjusted under 35 U.S.C. 154(b) by 107 days.

(21) Appl. No.: 10/384,048

(22) Filed: Mar. 7, 2003

(65) Prior Publication Data

US 2003/0152173 A1 Aug. 14, 2003

Related U.S. Application Data

(62) Division of application No. 09/363,813, filed on Jul. 30, 1999, now Pat. No. 6,560,299.

(51) Int. Cl.[7] .............................................. H04L 27/08
(52) U.S. Cl. ...................... 375/345; 375/347; 375/267; 455/136
(58) Field of Search ................................ 375/347, 345, 375/349, 260, 267; 455/136

(56) References Cited

U.S. PATENT DOCUMENTS

| | | | | |
|---|---|---|---|---|
| 5,184,349 A | * | 2/1993 | Riordan | 370/347 |
| 5,566,213 A | * | 10/1996 | Carsello | 375/344 |
| 5,668,839 A | | 9/1997 | Bernasconi et al. | 375/347 |
| 5,815,536 A | * | 9/1998 | Abe | 375/344 |
| 6,049,361 A | * | 4/2000 | Kim | 348/678 |
| 6,070,062 A | * | 5/2000 | Yoshida et al. | 455/234.1 |
| 6,614,855 B1 | * | 9/2003 | Okamoto | 375/316 |

* cited by examiner

Primary Examiner—Phuong Phu
(74) Attorney, Agent, or Firm—Allan Jacobson

(57) ABSTRACT

A multiple channel diversity receiver includes joint automatic gain control (AGC) signal processing wherein the first and second channels of the multiple channel diversity receiver share at least one joint AGC loop. The maximum difference between the AGC feedback signal in the control loop for the first channel and the AGC feedback control signal in the control loop for the second channel is limited to a selectable maximum differential. The AGC control loop with the stronger first RF signal thus limits the maximum amount that the weaker signal is amplified in the AGC control loop with the weaker second RF signal. By limiting the AGC feedback signal in the control loop of the second channel to a maximum differential with respect to the AGC feedback signal in the control loop of the first channel, the weaker signal is not overly amplified thereby avoiding the undue amplification of noise in the second channel.

4 Claims, 14 Drawing Sheets

DIVERSITY RECEIVER WITH JOINT AUTOMATIC GAIN CONTROL SIGNAL PROCESSING

This is a divisional of application Ser. No. 09/363,813, filed on Jul. 30, 1999 now U.S. Pat. No. 6,560,299.

FIELD OF THE INVENTION

The present invention relates to diversity receivers.

BACKGROUND OF THE INVENTION

Conventional television signals transmit video information in analog form by modulating the amplitude and frequency of a carrier signal. Digital television systems convert an analog video signal into digital information, which is transmitted by pulse modulating the amplitude and phase of a carrier signal. For example, in broadcasting high definition television (HDTV), digital information is transmitted by an 8 level amplitude modulation technique, known as 8VSB (vestigial sideband). In 8 VSB, modulation of a carrier to one of 8 levels (i.e., one of 8 symbols) defines 3 bits of digital information for each symbol clock interval. While analog television signals degrade gracefully in the presence of interference, digital broadcast systems can fail completely when the bit error rate overcomes the error tolerance of the system. Bit errors result from weak signals, noisy signals or signals subject to fading and distortion.

In an ideal radio wave propagation environment, there exists an unobstructed line-of-sight path between the transmitting and receiving antennas. Additionally, no other objects exist which may reflect the transmitted wave along another path to the receiving antenna. As is more often the case, however, there is no direct line of sight between the antennas. In an outdoor environment, natural or artificial obstructions, such as buildings, hills, and trees block the direct line of sight. Furthermore, these obstructions reflect the transmitted signal such that multiple versions with varying amplitudes, phases and time delays are simultaneously received.

The indoor environment is even more complicated since there is rarely an unobstructed path between the transmitter and receiver antennas. Furthermore, objects causing signal reflection and absorbtion are numerous and are often in motion.

Reception of the transmitted signal along multiple paths from the transmitter to the receiver causes signal distortion which manifests itself in a variety of ways. The different paths have different delays that cause replicas of the same signal to arrive at different times (like an echo) and sum at the receiver antenna, causing inter-symbol interference. The phases of these multipath signals may combine constructively or destructively resulting in large range of possible signal strengths. Additionally, this signal strength may vary with time or antenna location, and is known as signal fading. Signal fading can range from frequency selective fades to a flat fade over the entire frequency spectrum of interest. Indoor signals typically have severe multi-path distortions and are changing rapidly in time, ranging from flat fades to deep in-band nulls to relatively unimpaired signals. Conventional indoor TV antennas and outdoor antennas used with existing 8VSB receivers often do not produce reliable and uninterrupted reception of digital broadcast HDTV signals.

To mitigate the adverse effects of multiple path (multipath) distortion and signal fading, it is known to use a diversity receiver. In a diversity receiver, two (or more) independent antennas are used to receive two (or more) separate versions of the same signal. Each independent antenna provides a signal with different (ideally, uncorrelated) noise, fading and multi-path factors. These different signals may be obtained through various forms of diversity including spatial, temporal, polarization and direction-of-arrival diversity.

A diversity receiver has a plurality of receiver channels to process the plurality of antenna signals. By appropriate combining of the information extracted from each signal by each channel of the diversity receiver, a diversity receiver provides equal or superior performance compared to a non-diversity receiver operating on the "best" of the received signals alone.

In the prior art, the received signals in each of the individual receiver channels of a diversity receiver are processed separately and then combined. That is, each of the multiple receiver channels in a prior art diversity receiver is an independent receiver. Each of the respective diversity antenna signals is processed in one of the independent receiver channels of the diversity receiver.

Each receiver channel is independent in the sense that each includes a respective separate tuner, front-end function (such as for baud clock recovery and carrier recovery) and separate equalizer filter. The separate receiver channels of the prior art provide separate signal outputs, which are then combined in some manner.

In one prior art approach, the output of the separate diversity receiver channel having the stronger input signal (i.e., the higher signal to noise ratio) is selected over the output of the diversity receiver channel having the weaker input signal. In a second prior art approach, the outputs of the two diversity receiver channels are combined equally, regardless of input signal strength. In a third prior art approach, the outputs of the two receiver channels are combined in a maximal ratio combiner in accordance with the respective signal to noise ratio of each signal. In a maximal ratio combiner, the receiver channel with the highest signal to noise ratio provides the greatest contribution to the final output. In general, a prior art diversity receiver processes the received diversity signals in separate receiver channels with regard to receiver functions such as tuning, automatic gain control (AGC), baud clock recovery, RF carrier recovery, and forward equalization.

SUMMARY OF THE INVENTION

In one embodiment of a diversity antenna system for use in conjunction with the present invention, first and second identical antennas are separated, but oriented identically within a plane. The first and second antennas are separated by several wavelengths to provide respective first and second RF signals. The first and second RF signals are said to be reception by the use of spatial diversity since it is known that the multipath propagation channels (in a parameterized sense) from the transmitter to the first antenna and from the transmitter to the second antenna are nearly uncorrelated.

The present invention is embodied in a multiple channel diversity receiver with joint signal processing. In particular, the first and second RF signals are processed jointly in a multiple channel diversity receiver with respect to tuning, automatic gain control (AGC), baud clock recovery, RF carrier recovery and forward equalization. Joint processing, as compared to independent processing of the prior art, means that the multiple channels of the diversity receiver are linked or cross coupled to each other through various joint processing circuitry.

Tuning

In accordance with the present invention, the first and second RF signals are processed jointly in the multiple channel diversity receiver with respect to tuning. In particular, the first and second tuners in the first and second channels of the multiple channel diversity receiver share at least one joint local oscillator. In the case of a dual conversion tuner, first and second joint local oscillators are shared. A first joint local oscillator is shared in the RF stage of the first and second tuners, and a second joint local oscillator is shared in the IF stage of the first and second tuners. By sharing one or more joint local oscillators in separate tuners, the first and second channels of the multiple channel diversity receivers will therefore be coherent in frequency and phase and thus have common phase noise characteristics.

Automatic Gain Control (AGC)

In accordance with the present invention, the first and second RF signals are processed jointly in the multiple channel diversity receiver with respect to AGC. In particular, the respective tuners in the first and second channels of the multiple channel diversity receiver share at least one joint AGC loop. The maximum difference between the AGC feedback signal in the control loop for the first channel and the AGC feedback control signal in the control loop for the second channel is limited to a selectable maximum differential.

For example, suppose that the first RF signal in the first channel is a much stronger signal as compared to the second RF signal in the second channel. The first AGC loop amplifies the first RF signal very little, if at all, because it is already a strong signal. The second RF signal in the second channel is likely to be noisy because it is a relatively weak signal. In the prior art, the weaker noisy signal in the second channel would be greatly amplified by the AGC control loop of the second channel. Noise amplified in the AGC control loop second channel increases the noise problems and worsens the overall bit error rate when the first and second channels of the diversity receiver are combined equally.

In accordance with the present invention, the AGC control loop with the stronger first RF signal limits the maximum amount that the weaker signal is amplified in the AGC control loop with the weaker second RF signal. By limiting the AGC feedback signal in the control loop of the second channel to a maximum differential with respect to the AGC feedback signal in the control loop of the first channel, the weaker signal is not overly amplified. In such manner, the noise in the weaker noisy signal in the second channel would not be as greatly amplified by the joint AGC control loop of the second channel, as it would be in the case of an independent AGC loop.

Joint Timing Loop—Baud Clock Recovery

The baud clock is roughly equivalent to the data symbol clock. As in the above example for 8VSB each data symbol is 3 bits. The baud clock timing determines the point in time when the received signal is "sampled" to determine which of the 8 levels is represented by the current data symbol. In a diversity receiver, there is a separate baud clock recovery mechanism for each channel, each respective recovered baud clock representing the regular points in time at which the received signal is sampled to recover a data symbol in that respective channel. Known prior art techniques for recovering the baud clock include adaptive algorithms for estimating the energy at the edge of the data spectrum. In the general case, the baud clock timing will fall somewhere in between actual signal samples. An interpolator is used to interpolate between actual signal samples to obtain a signal "sample" at the baud clock timing.

The first and second RF signals are processed jointly in the multiple channel diversity receiver with respect to individual baud clock recovery. Although separate baud clocks are recovered for each channel, the baud clocks are recovered in a joint timing loop shared by both channels.

In accordance with the present invention, the respective front ends in the first and second channels of the multiple channel diversity receiver share a joint timing loop filter for baud clock recovery. The baud clock for each channel is synthesized in a respective phase locked loop (PLL) for each channel. Since both channels are assumed to be receiving the same signal, the received signal frequency in both channels is the same. The primary timing difference between the signals in the first and second channels is in the phase of each respective baud clock.

In accordance with the present invention, the timing loop filters of each channel are cross coupled to create a joint timing loop between both channels. By cross coupling the two PLL's in a joint loop filter, one channel (with the stronger signal) provides a dominant influence on the frequency of the synthesized baud clock in the other channel (with the weaker signal). By sharing a joint loop filter, the baud clock PLL in both channels will tend to be frequency locked to the frequency of the stronger signal, leaving the respective PLL's to make an individual phase adjustment for each channel. In such manner, the stronger signal in the first channel is used to determine the frequency of the baud clock for the weaker signal in the second channel.

In addition, the respective front ends in the first and second channels of the multiple channel diversity receiver share a skew corrector for baud clock recovery. A skew correction is needed when the multipath delay between the first and second RF signals in the two channels is greater than one whole baud clock period. That is, even though the frequency and phase of the respective baud clock for received signals in the first and second channels is determined in the joint timing loop, there may be whole baud skews between the two received signals. The purpose of the whole baud skew corrector is to align the received data bits in the first channel with the received data bits in the second channel.

In accordance with the present invention, a whole baud skew corrector is provided, which couples the first and second channels of the diversity receiver in a joint timing loop for baud clock recovery. In particular, after the joint loop filter of the joint timing loop settles down near steady state frequency and phase for each respective baud clock, the whole baud skew corrector is enabled.

The whole baud skew corrector computes the correlation between the first and second received signals. First and second signals without any skew (i.e., properly aligned signals) show high correlation values. First and second signals with substantial skew between the two signals show low correlation values. The first and second signals are then shifted by one whole baud period with respect to each other in a variable delay memory and the correlation is recomputed. The process of shifting the first and second received signals and computing the correlation function is repeated for various whole baud shifts in accordance with a search strategy to find the best (highest) correlation. The whole baud skew corrector shifts one or both channels in respective variable delay memories to properly align the received first and second signals in accordance with the whole baud skew delay that produced the best correlation between the first and second received signals.

Joint Pilot Loop—RF Carrier Recovery

In order to demodulate (de-rotate) the received signal, the original RF carrier is recovered at the receiver. A separate RF carrier is recovered for each of the first and second channels in the diversity receiver and used to de-rotate each of the first and second received signals.

In accordance with the present invention, the respective front ends in the first and second channels of the multiple channel diversity receiver share a joint pilot loop filter for RF carrier recovery. The RF carrier signal for each channel is synthesized in a respective phase locked loop (PLL) for each channel. However, since both channels are assumed to be receiving different (multipath) versions of the same signal, the frequency of the RF carrier is the same in both channels. The difference between synthesis of the RF carrier in the two channels is the phase of each respective synthesized RF carrier in each respective channel.

In accordance with the present invention, the respective front ends of the multiple channel diversity receiver share a joint pilot loop filter in the respective PLL for RF carrier clock recovery in the first and second channels. In particular, the pilot loop filters of each channel are cross coupled to create a joint pilot loop between both channels.

By cross coupling the two RF carrier recovery PLL's in a joint loop filter, the channel with the stronger signal provides a dominant influence on the frequency of the synthesized recovered RF carrier in the channel with the weaker signal. By sharing a joint loop filter, the phase locked pilot loops in both channels will tend to be frequency locked to the stronger signal, leaving the respective phase locked pilot loops to make an individual phase adjustment for each channel. In such manner, the stronger signal in one channel is used to determine the frequency of the recovered RF carrier signal for the weaker signal in the other channel.

Forward Equalization

In accordance with another aspect of the present invention, the first and second RF signals are processed jointly in the multiple channel diversity receiver with respect to forward equalization. In particular, the respective first and second channels of the multiple channel diversity receiver share a common equalization filter tap allocation scheme. That is, the number of available equalization filter taps is allocated to either the first channel or the second channel on the basis of relative need.

By way of background review, it is known to use an equalizer to mitigate the signal corruption introduced by the communications channel. An equalizer is a filter that has the inverse characteristics of the communication channel. In situations where the communication channel is not characterized in advance, or changes with time, an adaptive equalizer is used. The variable parameters (filter coefficients) of the adaptive equalizer are calculated at the receiver. After the filter parameters are properly adjusted, the equalizer filter compensates for transmission channel distortion and noise. The problem to be solved in an adaptive equalizer is how to adjust the equalizer filter parameters in order to restore signal quality to a performance level that is acceptable by subsequent error correction decoding.

A critical factor in an adaptive equalization system is to complete all the required multiplication operations within the time available: i.e., a single symbol interval. In particular, the calculation of filter parameters requires successive multiply operations for each equalizer parameter. Since a typical equalizer filter may have up to 512 filter coefficients (the number of equalizer filter parameters), the total time required to complete all the required multiplication operations with full precision often exceeds one symbol interval.

Using an equalization filter with fewer taps (coefficients) requires less computation time, but a filter with fewer coefficients is a poorer approximation to the inverse of the communication channel distortion. On the other hand, the communication channel typically introduces distortion which is clustered around certain time delays, so that most of the filter coefficients will be set to zero or near zero anyway. Therefore, an equalization filter with fewer taps could be used, provided the nonzero taps are at the correct positions.

The present invention is embodied in a tap allocation mechanism in a diversity receiver to allocate more of the available filter taps to the channel with the greater distortion and noise. The total numbers of taps to be allocated between both the first and second channels is fixed. At the start of adaptation, each equalization filter is initialized with an equal number of taps. The taps are thereafter dynamically allocated to the equalization filters of either the first or second channels on the basis of actual received signals. Thus, if both channels have equal signal path distortions, the number taps will be equally allocated to the equalization filter in each channel. On the other hand, if the signal in the first channel has greater signal path distortion than the signal in the second channel, then more equalizer taps will be allocated to the equalization filter of the first channel (and less equalizer taps allocated to the equalization filter of the second channel). In such manner, equalizer taps are efficiently allocated to the equalization filter in the channel where it is most needed.

DETAILED DESCRIPTION

System

Figure 2:
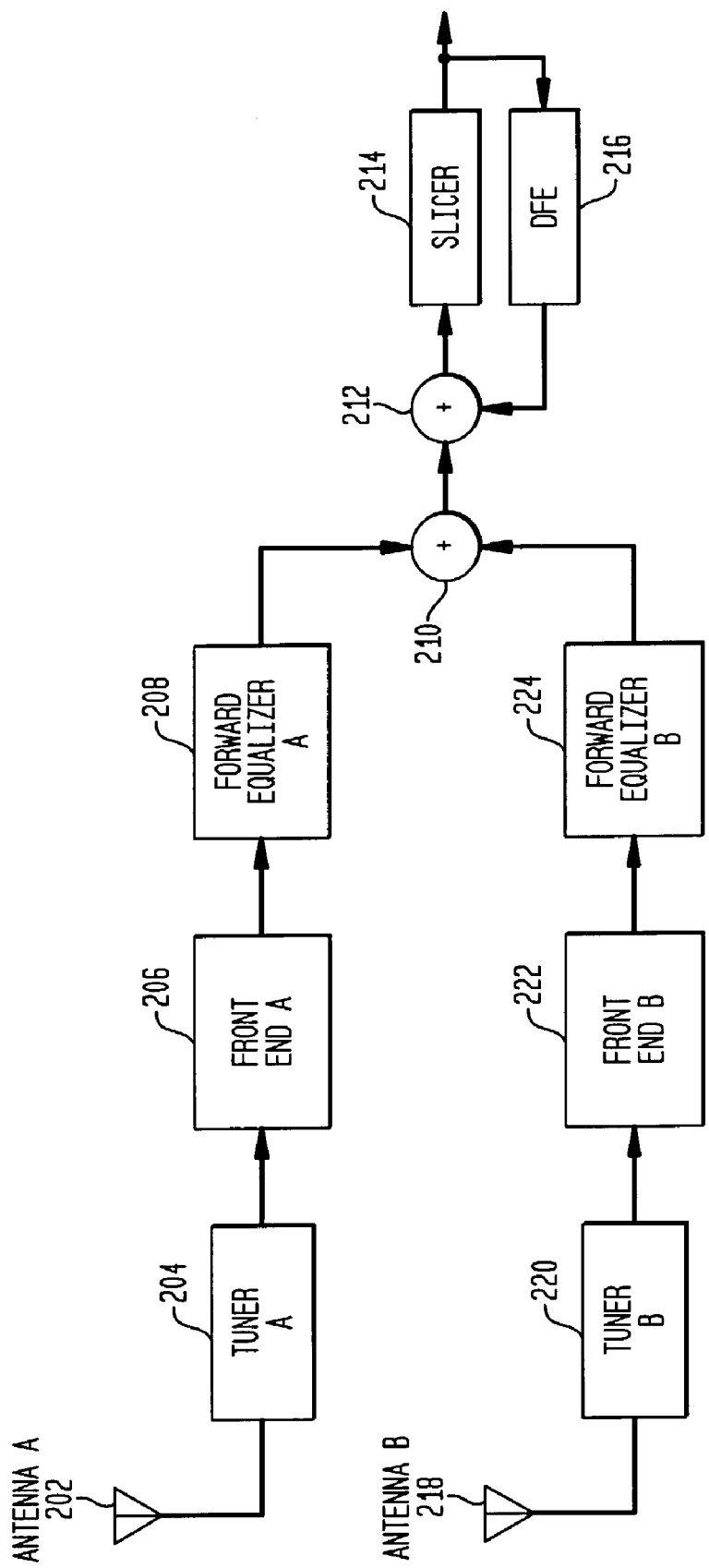
FIG. 2 is a block diagram of a prior art diversity receiver.

A prior art diversity receiver with two channels responsive to first and second antennas 202, 218 is shown in FIG. 2. The first channel includes a tuner 204, a front end signal processor 206 and a forward equalizer 208. The second channel includes a separate tuner 220, a separate front end signal processor 222 and a separate forward equalizer 224 each of which are independent of the corresponding functions in the first channel. The respective output of each of the two separate and independent channels of the diversity receiver are combined together in combiner 210, which combines the first and second channels of the diversity receiver into a single channel containing one combined signal. As indicated, there are numerous strategies in the prior art for combining the output signals from the channels of a multiple channel diversity receiver. The output of combiner 210 is coupled to a feedback equalization filter, comprising adder 212, slicer 214 and decision feedback equalizer (DFE) filter 216.

Figure 1:
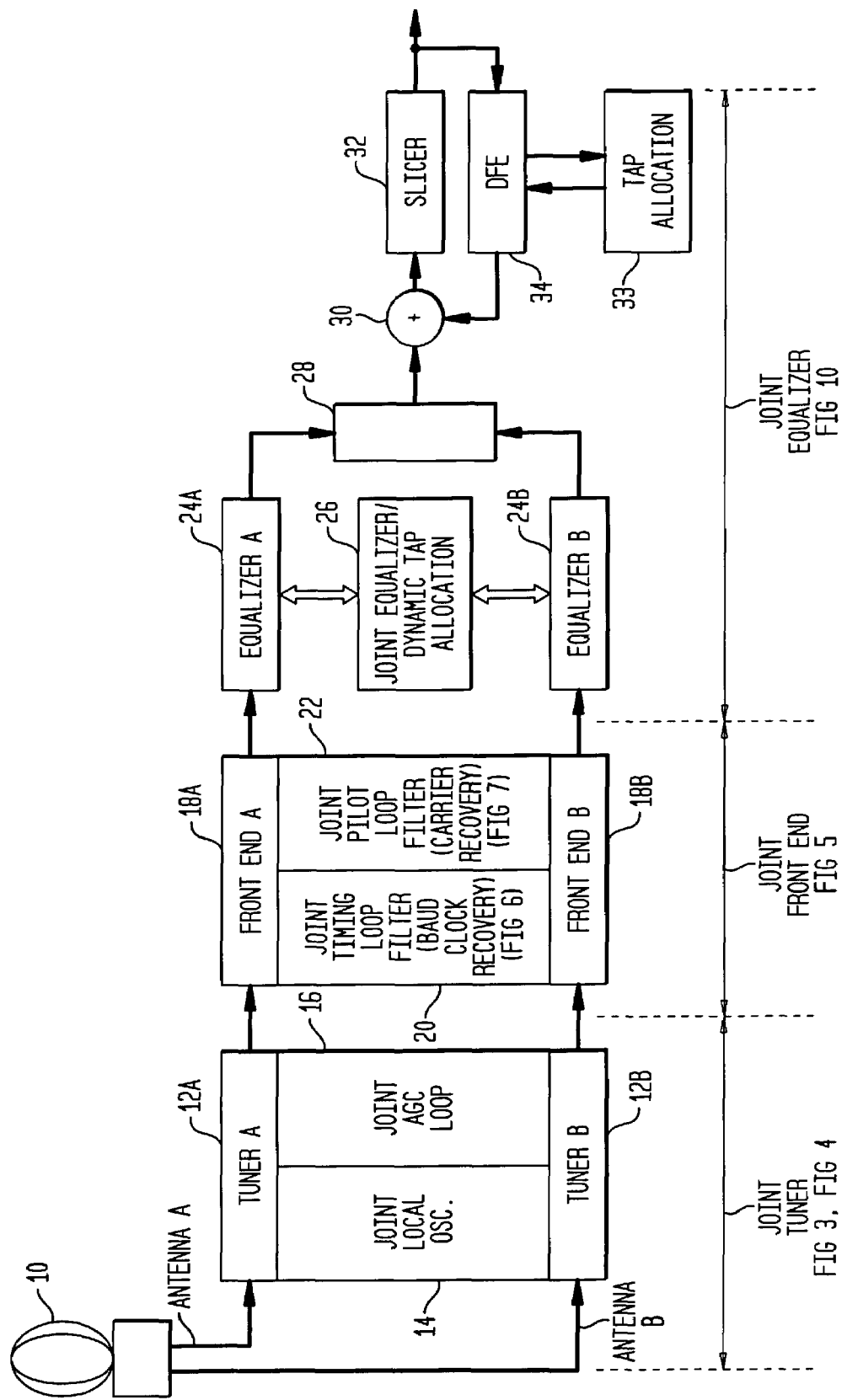
FIG. 1 is a system block diagram of a multiple channel diversity receiver embodying the joint signal processing of the present invention.

A multiple channel diversity receiver system with joint processing of first and second signals in respective first and second channels in accordance with the present invention is shown in FIG. 1. Joint processing of first and second signals shall mean herein that the processing of the first signal shall effect or influence the processing of the second signal with respect to the same signal processing function. Also, as used herein, the terms, "channel", "receiver channel", "channel A" and "first channel", and "channel B" and "second channel" are equivalent terms. A diversity receiver has at least two channels. Each channel begins at the respective antenna input terminal and continues to process separate first and second RF (radio frequency) signals up to the point where the signals in the two channels are combined into one combined signal, which is thereafter processed in a single combined channel. After forming the one combined signal in the single combined channel, the signal contributions from the original first and second RF signals can no longer be separately and independently processed.

With reference to FIG. 1, the diversity receiver has first and second channels coupled to respective first and second antennas 10. A compound antenna 10 is comprised of two separate antennas loops A and B, which are positioned within a plane, oriented identically, and separated by several wavelengths. While FIG. 1 illustrates a two channel, two dimensional diversity receiver system, a three dimensional system may be created by the addition of a third spatially separated and a third receiver channel. Higher order dimensions may be created by adding additional antennas and additional receiver channels.

A first channel of the diversity receiver consists of a tuner 12A, a front end 18A and a forward equalizer 24A. A second channel of the diversity receiver consists of a tuner 12B, a front end 18B and a forward equalizer 24B. The first and second channels of the diversity receiver are not independent, but include joint signal processing as described below.

The first and second tuners 12A, 12B process signals jointly by sharing a joint local oscillator 14 and a joint AGC loop 16. After the tuning stages, the first and second signals at the output of tuners 12A and 12B are converted from analog to digital in respective A/D converters (not shown). The resulting streams of digital samples are input to respective first and second front ends 18A, 18B. The first front end 18A and the second front end 18B process signals jointly by sharing a joint timing loop 20 for baud clock recovery and a joint pilot loop 22 for carrier recovery. After the front end processing, the first and second signals of the first and second channels are coupled to an equalizer with joint signal processing. In particular, the first and second signals at the output of the first and second front ends 18A, 18B are coupled to respective forward equalizer filters 24A, 24B. The first and second signals are further processed jointly in the forward equalizer filters 24A, 24B by dynamically allocating 26 equalization filter taps among the first and second forward equalizers 24A, 24B.

The first and second signals at the respective outputs of the first and second equalizer filters 24A, 24B are added in combiner 28 and processed in a joint feedback equalization filter, which comprises adder 30, slicer 32 and decision feedback equalizer filter 34. Joint processing of the first and second channels is achieved by dynamic tap allocation 33 to allocate equalization filter taps of the DFE 34 among the signal samples of the first and second channels.

Figure 3:
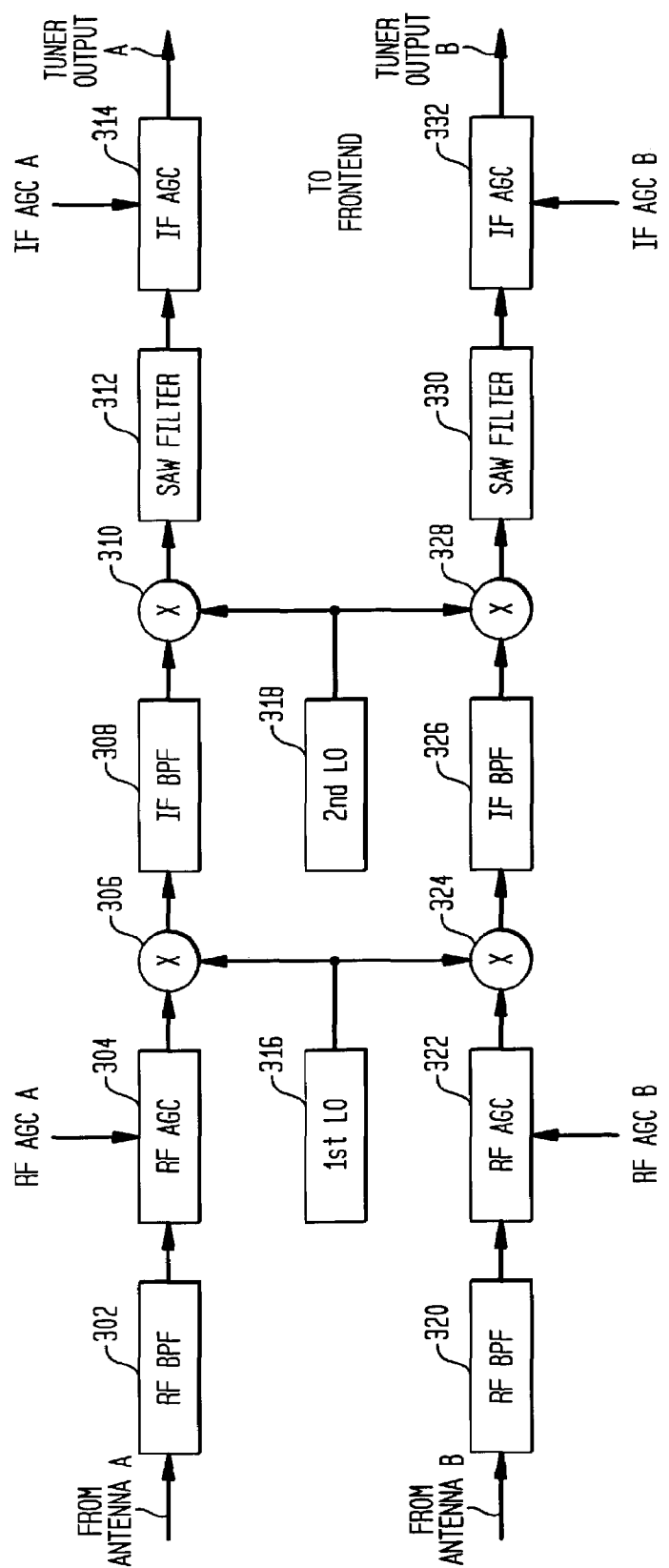
FIG. 3 is a block diagram of a joint tuner for use in a multiple channel diversity receiver in accordance with the present invention.

Joint Tuner, Shared Local Oscilators—FIG. 3

A joint dual channel, dual conversion tuner with shared local oscillators, is shown in FIG. 3. Respective inputs from antenna A and antenna B are coupled to each of first and second channels. Each joint tuner channel includes an RF conversion stage with an RF band pass filter 302, 320, an RF AGC stage 304, 322, a mixer 306, 324 and a first IF (intermediate frequency) band pass filter 308, 326. Each joint tuner channel further includes a second conversion stage with a second mixer 310, 328, second IF SAW filter 312, 330 and IF AGC stage 314, 332. The first and second tuner channels share a joint first (RF) local oscillator 316 coupled to mixers 306 and 324. In addition, the first and second tuner channels share a joint second (IF) local oscillator 318 coupled to mixers 310 and 328.

Figure 4:
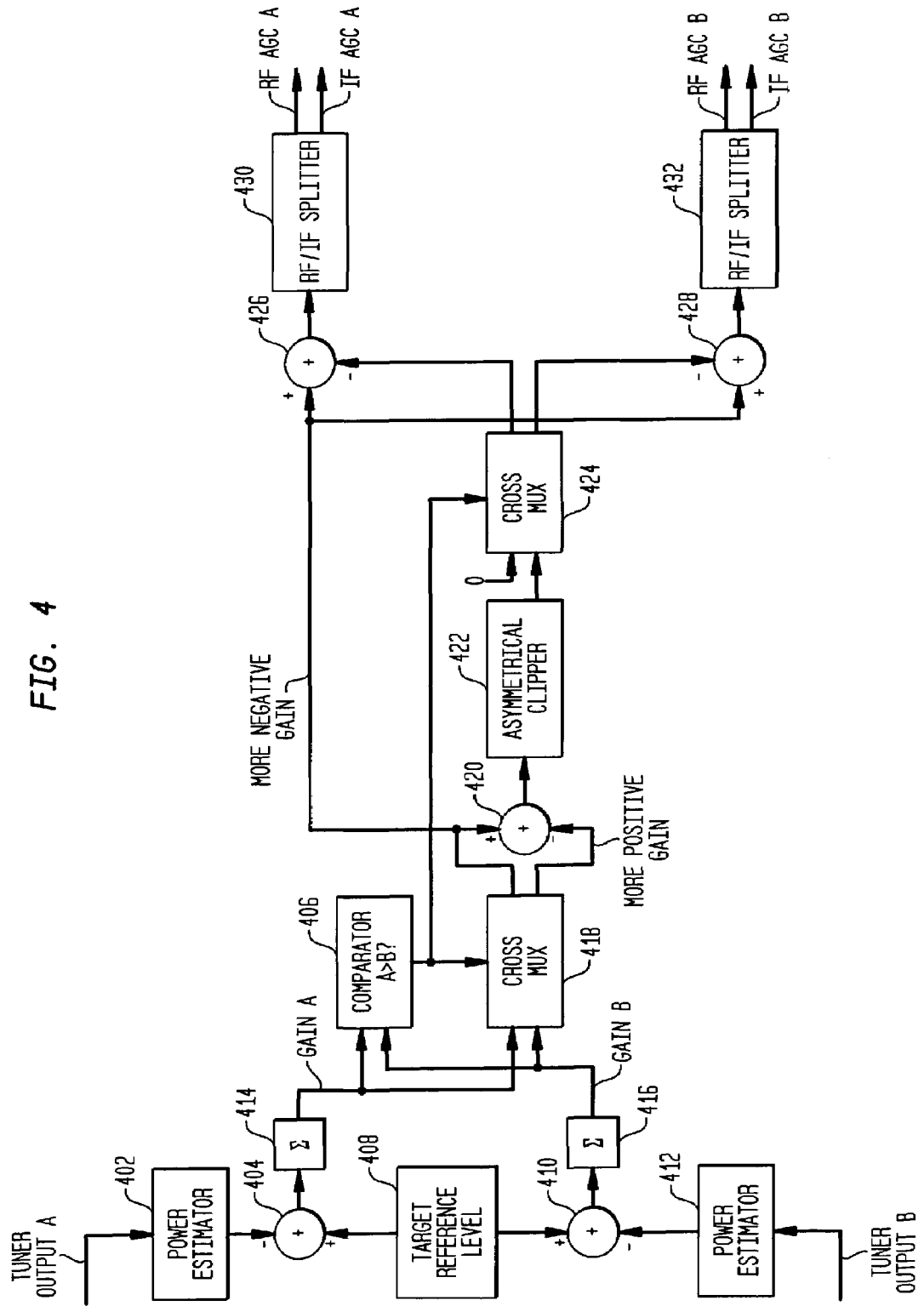
FIG. 4 is a block diagram of a joint AGC loop for use in a multiple channel diversity receiver in accordance with the present invention.

Joint Tuner, Shared Automatic Gain Control (AGC)—FIG. 4

The joint AGC loop 16 of FIG. 1 is shown in further detail in FIG. 4. The joint AGC includes a power estimator 402, 412 for each channel, a reference 408, integrators 414, 416 and adders 404, 410, 420, 426 and 428. A power estimator is a signal level sensing circuit, which provides a measure of the signal level (in this case, power) for comparison with a target reference level 402, 412. In addition there is provided a signed comparator 406, cross multiplexors 418, 424 and an asymmetrical clipper 422. A cross multiplexor is a switching device for connecting two inputs to two outputs. Responsive to a control input, a cross multiplexor either directly connects, or cross connects (swaps) its two inputs and two outputs. An asymmetrical clipper 422 limits the most negative excursion of an input signal to a predetermined value at the output of the asymmetrical clipper.

The joint AGC of FIG. 4 jointly processes AGC signals so as to limit the amount that the weaker signal will be boosted by AGC action as compared to the AGC boost of the stronger signal. The joint AGC detects the channel with stronger signal and adjusts the AGC for that channel so as to meet the target reference level in that channel. The joint AGC then limits the maximum difference for the AGC adjustment level in the other channel. Initially a target reference 408 is set to the desired signal power level.

In operation, a power estimate for signal output from tuner A (and tuner B) is made in a power estimator 402 (412). The output of the power estimator is subtracted from the target reference level 408 (which represents the desired signal power level of the stronger signal). The error at the output of adder 404 (410) is integrated 414 (416) to form Gain A signal (Gain B signal). Gain A and Gain B are inputs to comparator 406 and to cross multiplexor 418. Comparator 406 determines which receiver channel has a greater Gain signal (in a signed magnitude sense).

If Gain A is greater than Gain B, then the comparator 406 causes cross multiplexors 418 and 424 to switch their respective inputs to their respective outputs. The greater Gain signal (most positive) is always on the negative input to adder 420. Alternatively, the positive input to adder 420 always has the smaller (more negative) Gain signal. The output of adder 420 represents the Gain difference (between channel A and channel B), and is always a negative number. The asymmetric clipper in 422 limits the most negative excursion of the Gain difference between channel A and channel B. The value of the clipped level in the asymmetrical clipper 422 represents the maximum permissible difference in the AGC Gain signals for channel A and channel B.

To adjust the AGC gain in channel A and channel B, cross multiplexor 424, responsive to the decision made by comparator 406, outputs either a 0 or the clipped value of the Gain difference from asymmetrical clipper 422. Cross multiplexor 424 selects a zero value to be added to the Gain signal of the receiver channel that has the lesser Gain signal. In such manner, the channel with the greater received signal power has zero added to its respective AGC Gain signal in one of adders 426 or 428. Cross multiplexor 424 selects the clipped Gain difference (a negative number at the output of asymmetrical clipper 422) to be added (signed addition) to the Gain signal of the receiver channel that has the greater Gain signal. In such manner, the channel with the smaller received signal power has the clipped gain difference added (by signed addition) to its respective AGC Gain signal in one of adders 426 or 428.

The desired AGC Gain signal for channel A (B) is provided at the output of adder 426 (428). The total desired AGC gain is divided between RF AGC and IF AGC. In particular, a splitter 430 (432) divides the desired AGC Gain signal between RF AGC Gain and IF AGC Gain.

Figure 5:
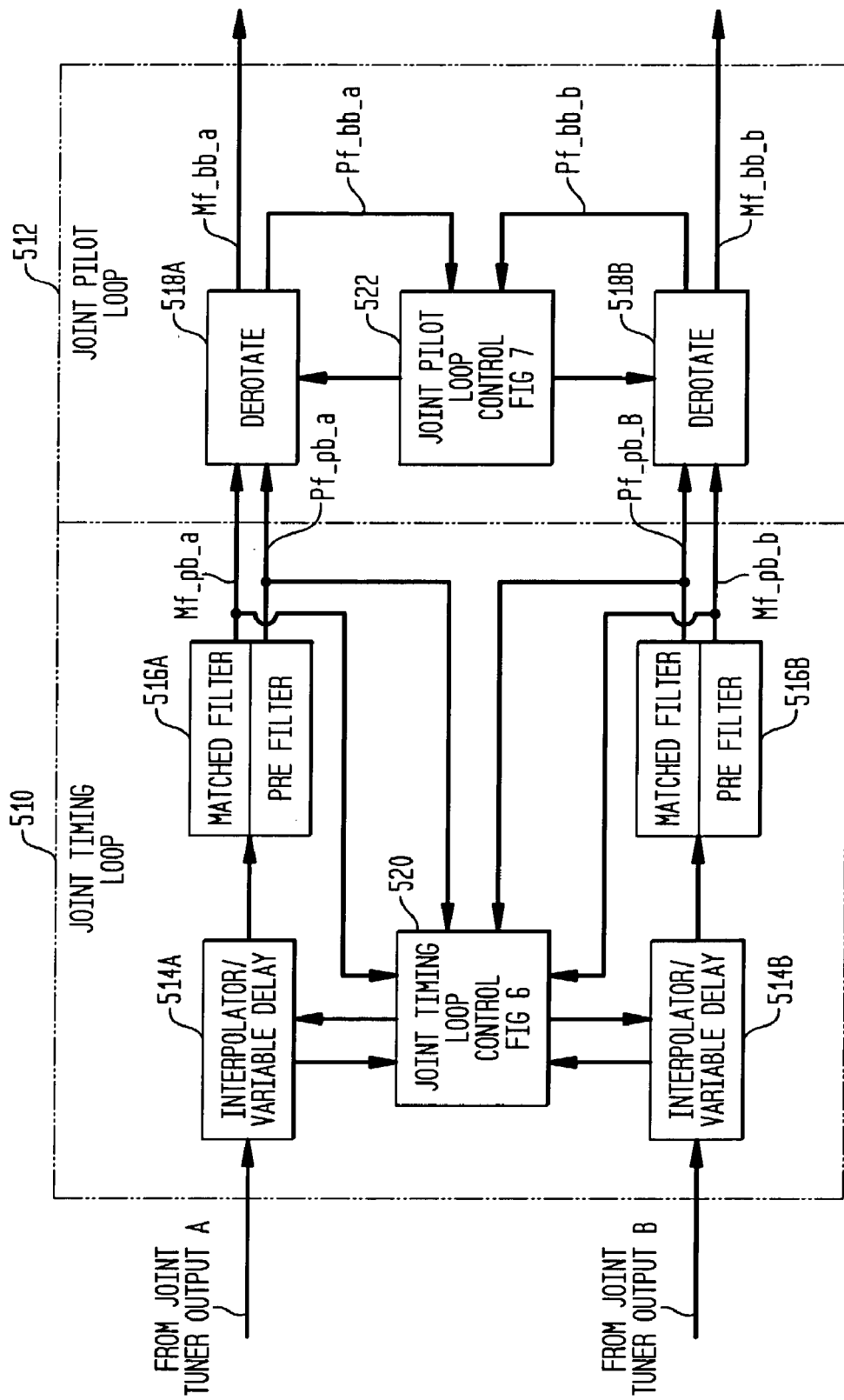
FIG. 5 is a block diagram of a joint receiver front end for use in a multiple channel diversity receiver in accordance with the present invention.

Joint Front End—FIG. 5

A joint front end processor with dual joint channels is shown in FIG. 5. The dual joint channels in the joint front end processor include a dual channel joint timing loop 510 and a dual channel joint pilot loop 512. As indicated, the purpose of the joint timing loop 510 is to recover the baud clock timing in each respective channel. The purpose of the joint pilot loop 512 is to recover the carrier signal which is used for demodulating (derotating) the received signal in each respective channel. Both the baud clock and the carrier signal are recovered in respective phase locked loops using respective joint loop filters.

Figure 8A:
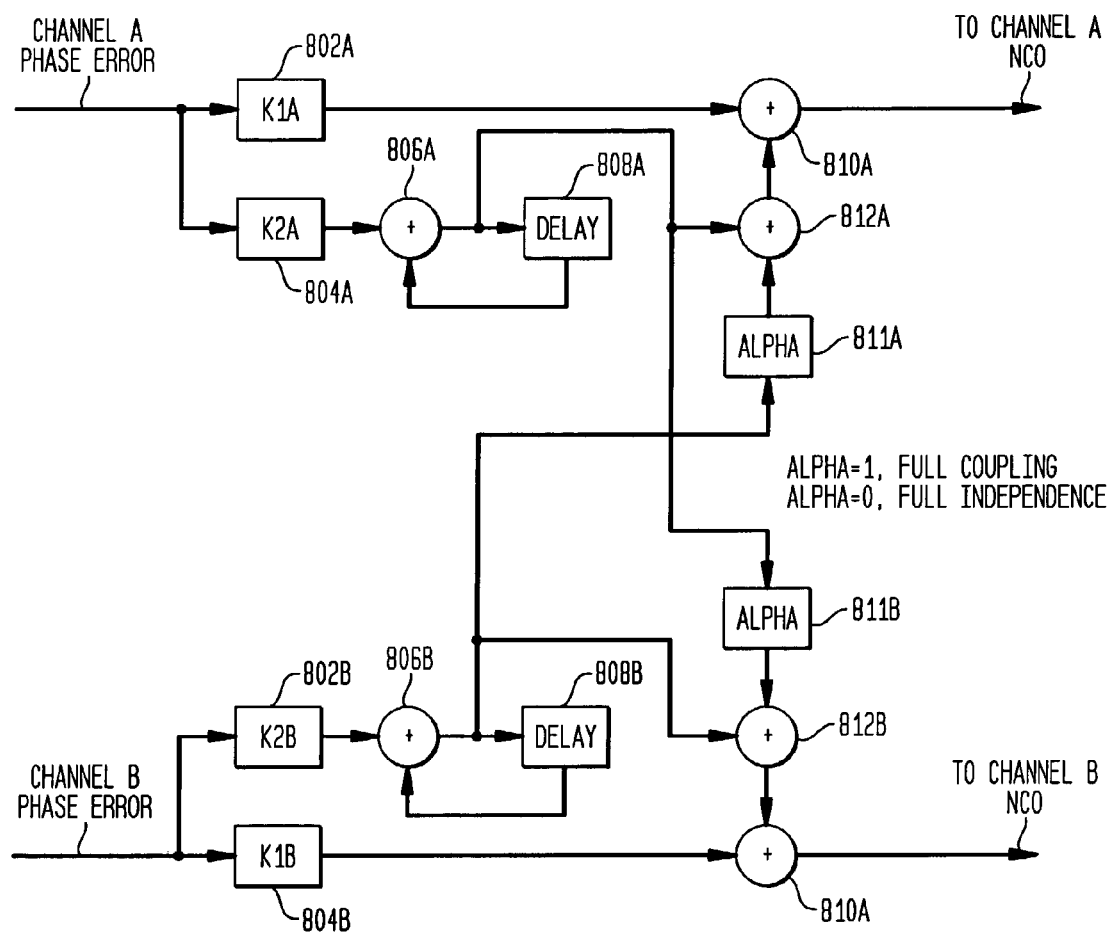
FIG. 8A is a block diagram of a generalized joint loop filter in accordance with the present invention for use in the joint timing loop of FIG. 6 and joint pilot loop of FIG. 7.
Figure 8B:
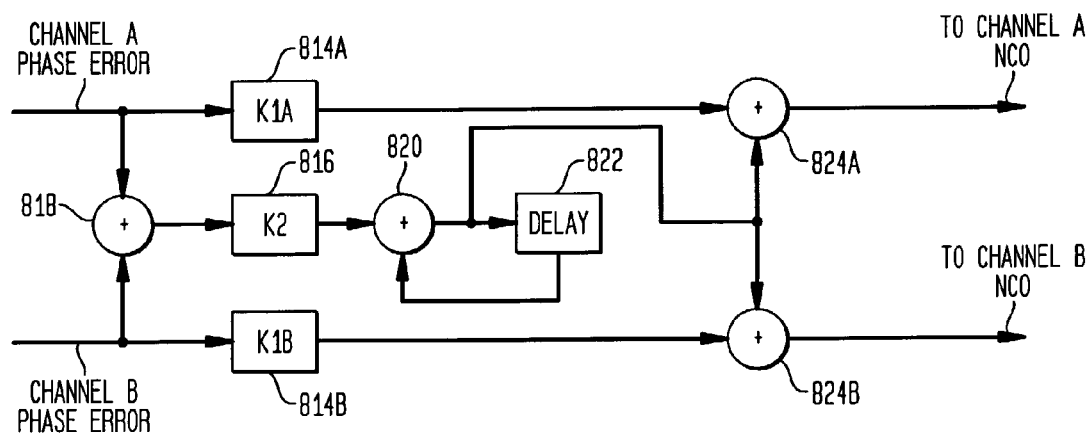
FIG. 8B is a block diagram of a specific joint loop filter in accordance with the present invention for use in the joint timing loop of FIG. 6 and joint pilot loop of FIG. 7.

Joint Loop Filter for use in PLL's—FIGS. 8A, 8B

A key element for use in the joint front end of FIG. 5, by which joint processing is implemented, is the joint loop filter illustrated in the general case in FIG. 8A and in the special case of FIG. 8B. FIG. 5 incorporates the joint loop filters of FIG. 8A or 8B by reference. That is, the block diagram of FIG. 5 references FIG. 6 and FIG. 7 for further detail. However FIGS. 6 and 7 both reference FIGS. 8A and 8B for further details of a joint loop filter. Therefore, the joint loop filter of either of FIG. 8A or 8B is incorporated by reference into FIG. 5.

By way of brief review, a loop filter is used in the feedback path of a phase locked loop (PLL). A PLL is closed loop feedback control system for controlling the frequency and phase of an oscillator. The controlled oscillator may be a numerically controlled oscillator (NCO) responsive to a numerical input that counts out the period of the desired sine wave or cosine wave (as in FIG. 6). The controlled oscillator may alternatively be a sine/cosine generator that directly synthesizes a sine wave or cosine wave responsive to a numerical input (as in FIG. 7). The controlled oscillator may also be a voltage controlled oscillator (VCO) responsive to an input voltage.

In the prior art, a separate and independent PLL operates as follows: The phase error estimate of the output signal to be controlled is detected in a phase detector. The PLL loop filter is responsive to the phase error signal from the phase detector to determine a value for the numerical control signal to the controlled oscillator. The output of the loop filter thus controls the frequency and phase of the controlled oscillator. The controlled oscillator in turn changes its output responsive to the control input. The new (changed) phase error is measured by the phase detector, which changes the input to the loop filter. The process continues until the PLL converges (and locks) to a stable tracking state reducing (and keeping) the frequency and phase error of the controlled oscillator to an acceptably low value.

The joint loop filter of the present invention is used to cross couple two phase locked loops together for joint signal processing. A joint loop filter with a variable coupling factor (alpha) is shown in FIG. 8A. A first loop filter includes multiplication by constants K1A (802A) and K2A (804A), a delay element 808A, and adders 806A and 810A. A second loop filter includes multiplication by constants K1B (802B) and K2B (804B), a delay element 808B, and adders 806B and 810B.

The first loop filter and the second loop filter are joined together to form a joint loop filter by the addition of adders 812A, 812B and multipliers 811A, 811B which multiply by the cross coupling factor, alpha. The cross coupling factor, alpha, determines the amount of cross coupling between the first loop filter and the second loop filter. If alpha 811A is set to zero, then adder 812A does not add anything to the first loop filter output. Therefore, when alpha=0, the first loop filter 802A, 804A, 806A, 808A, 810A form an independent PLL loop filter. Similarly, when alpha=0, the second loop filter 802B, 804B, 806B, 808B, 810B form an independent PLL loop filter.

However, when alpha is non-zero, a portion of the output of adder 806B in the second loop filter is introduced into the first loop filter through adder 812A. At the same time, a portion of the output of adder 806A in the first loop filter is introduced into the second loop filter through adder 812B. Thus, the first and second loop filters are cross coupled, whereby each loop filter contributes to a portion of the output of the other loop filter. Setting alpha equal to 1 represents full coupling between the first loop filter and the second loop filter. The special case of full coupling (alpha=1) is shown in FIG. 8B.

In FIG. 8B, a first loop filter comprises multiplication by constant K1A (814A) and constant K2 (816), adder 818, a delay element 822, and adder 824A. A second loop filter comprises multiplication by constant K1B (814B) and constant K2 (816), adder 818, a delay element 822, and adder 824B. Thus, the first loop filter and the second loop filter share a common multiply factor K2 816, adder 818, adder 820 and delay element 822. The joint loop filter (FIGS. 8A, 8B) is used in both the joint timing loop (616 in FIG. 6) and the joint pilot loop (716 in FIG. 7).

Each joint loop filter has two constants K1 (K1A or K1B) and K2 and a delay 822. The delay 822 is a one sample memory, which, together with adder 820 forms an integrator common to channel A and channel B. Constants K1A, K1B, and K2 are parametric values which are changed as necessary. For example, one set of values for K1A, K1B and K2 is used during signal acquisition, and a different set of values is used during signal tracking after acquisition.

Multiplication of the input phase error by constant K1 (K1A or K1B) represents the phase offset, or proportional phase error, in the output of the loop filter. Multiplication of the input phase error by constant K2, integrated in the integrator formed by adder 820 and delay 822 represent the frequency offset, or instantaneous frequency error, in the output of the loop filter. However, the input to the integrator (scaled first by K2) is the sum of the input phase error in channels A and B, which sum, formed in adder 818, links the signal processing in channels A and B. Channel A and channel B thus share a common constant K2 and common integrator (adder 820 and delay 822). Furthermore, the frequency error at the output of adder 820 is added to both the channel A control signal via adder 824A, and also added to the channel B control signal via adder 824B.

In such manner, the dual phase locked loops of a joint phase locked loop are linked through the joint loop filter to share a common frequency. Since the dual channels of the diversity receiver are receiving different versions of the same signal (via multipath), the common frequency of each of the phase locked loops is assumed to be correct and the same in each channel. The remaining job of each of the phase locked loops is to adjust for phase error (via K1A, K1B) in each of the dual channels of the diversity receiver.

Since the frequency of the signal in both channels must be the same, a shared constant K2 helps the phase locked loops track each other. By sharing constant K2 and integrator 820, 822, the channel with the stronger signal tends to frequency lock the phase locked loop in the channel with the weaker signal. In such manner, the first and second signals in the first and second channels of the diversity receiver are frequency locked but not phase locked.

In operation, phase error estimates from each channel are summed in added 818, scaled 816 by the constant K2 (integral parameter) and accumulated in the integral portion (delay 822) of the joint loop filter. The individual phase estimates are also scaled by the respective K1A, K1B (proportional parameter) and combined with the common integral value from adder 820 in adders 824A and 824B. The output of the respective adders 824A and 824B are applied to the respective NCO's of the first and second channels respectively, of the diversity receiver.

Returning to FIG. 5, a joint timing loop 510 comprises a first interpolator/variable delay 514A, coupled to receive an output (output A) from the joint tuner, and having an output coupled to a Matched filter/Pre filter 516A. The second channel of the joint timing loop 510 comprises a second interpolator/variable delay 514B, coupled to receive the other output (output B) from the joint tuner, and having an output coupled to a Matched filter/Pre filter 516B. A description of the Matched filter/Pre filter 526A, 516B and its operation may be found in U.S. Pat. No. 5,872,815. The signal nomenclature for the Matched filter/Pre filter output signals is that Mf=Matched Filter, pb=passband, bb=baseband, a= channel A, and b=channel B.

A joint timing control 520 is coupled to the Mf_pb_a and Pf_pb_a outputs of Matched filter/Pre filter 516A, and to the Mf_pb_b and Pf_pb_b outputs of Matched filter/Pre filter 516B. Finally, the joint timing control 520 is coupled to, and controls both interpolator/variable delays 514A and 514B. A joint pilot loop 512 includes a first derotator (demodulator) 518A coupled to receive the respective Mf_pb_a and Pf_pb_a outputs from Matched filter/Pre filter 516A. The second channel of the joint pilot loop 512 includes a second derotator (demodulator) 518B coupled to receive the respective Mf_pb_b and Pf_pb_b outputs from Matched filter/Pre filter 516B. The outputs of the derotators 518A, 518B are the baseband versions of the respective input passband signals. Thus, the output for one channel of the joint pilot loop is Mf_bb_a, while the output for the other channel of the joint pilot loop is Mf_bb_b. A joint pilot loop control 522 is coupled to receive the Pf_bb_a output of derotator 518A and the Pf_bb_b output of derotator 518B. The joint pilot loop control 522 provides a recovered carrier signal to derotators 518A and 518B.

In operation, the two outputs from the dual tuner of FIG. 3 (output A and output B) are input to the dual channel joint front end of FIG. 5. The joint timing loop 510 recovers the baud clock for each respective channel by jointly using signals from both receiver channels. The recovered baud clock timing is further used to shift the signal in channel A and channel B into relative time alignment by adjusting the amount of respective delays in the interpolator/variable delays 514A and 514B. Then, the joint pilot loop 512 generates a recovered carrier signal by using signals from both receiver channels to provide respective demodulated baseband outputs, Mf_bb_a and Mf_bb_b.

Figure 6:
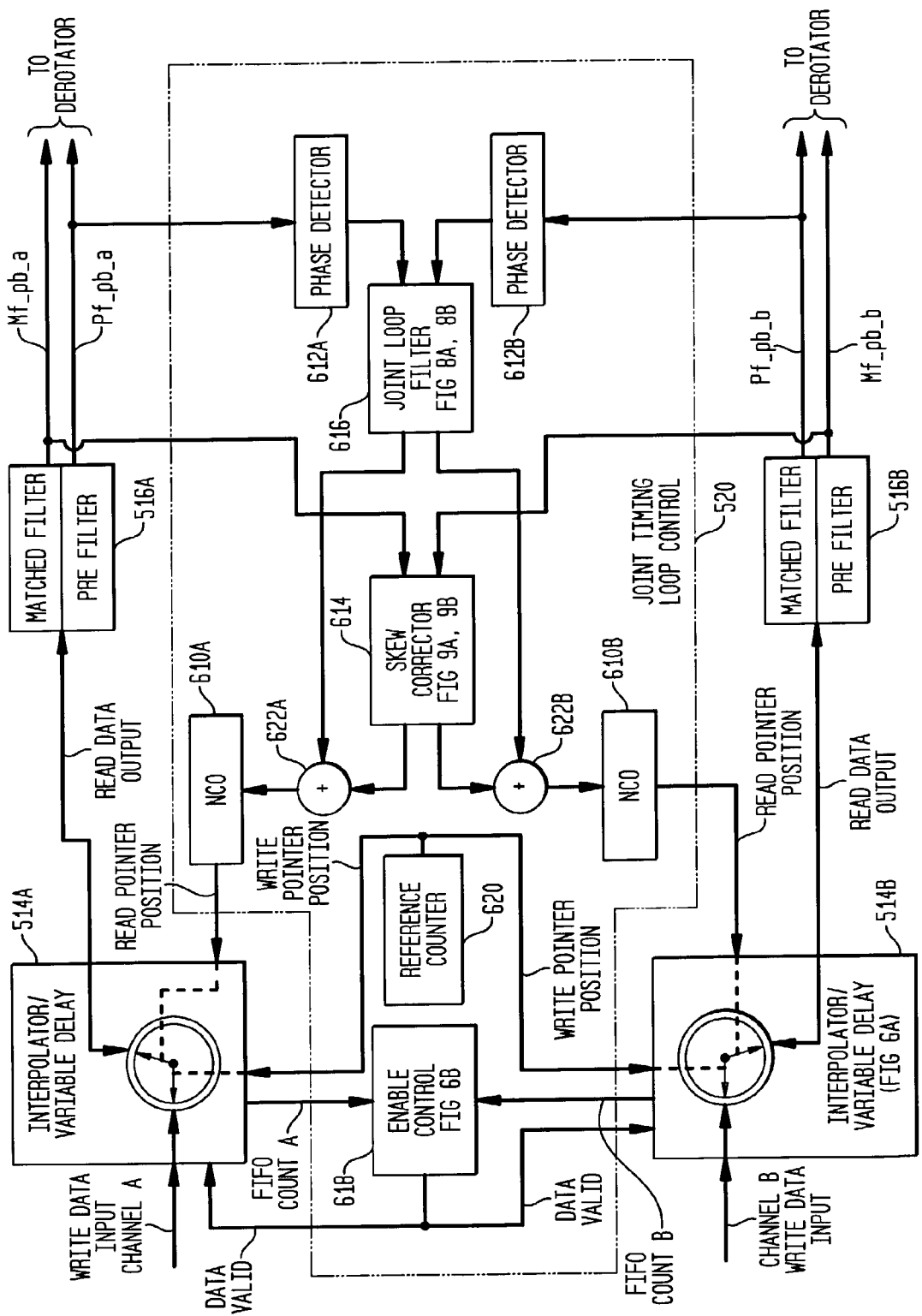
FIG. 6 is a block diagram of a joint timing loop for baud clock recovery for use in a multiple channel diversity receiver in accordance with the present invention.
Figure 6A:
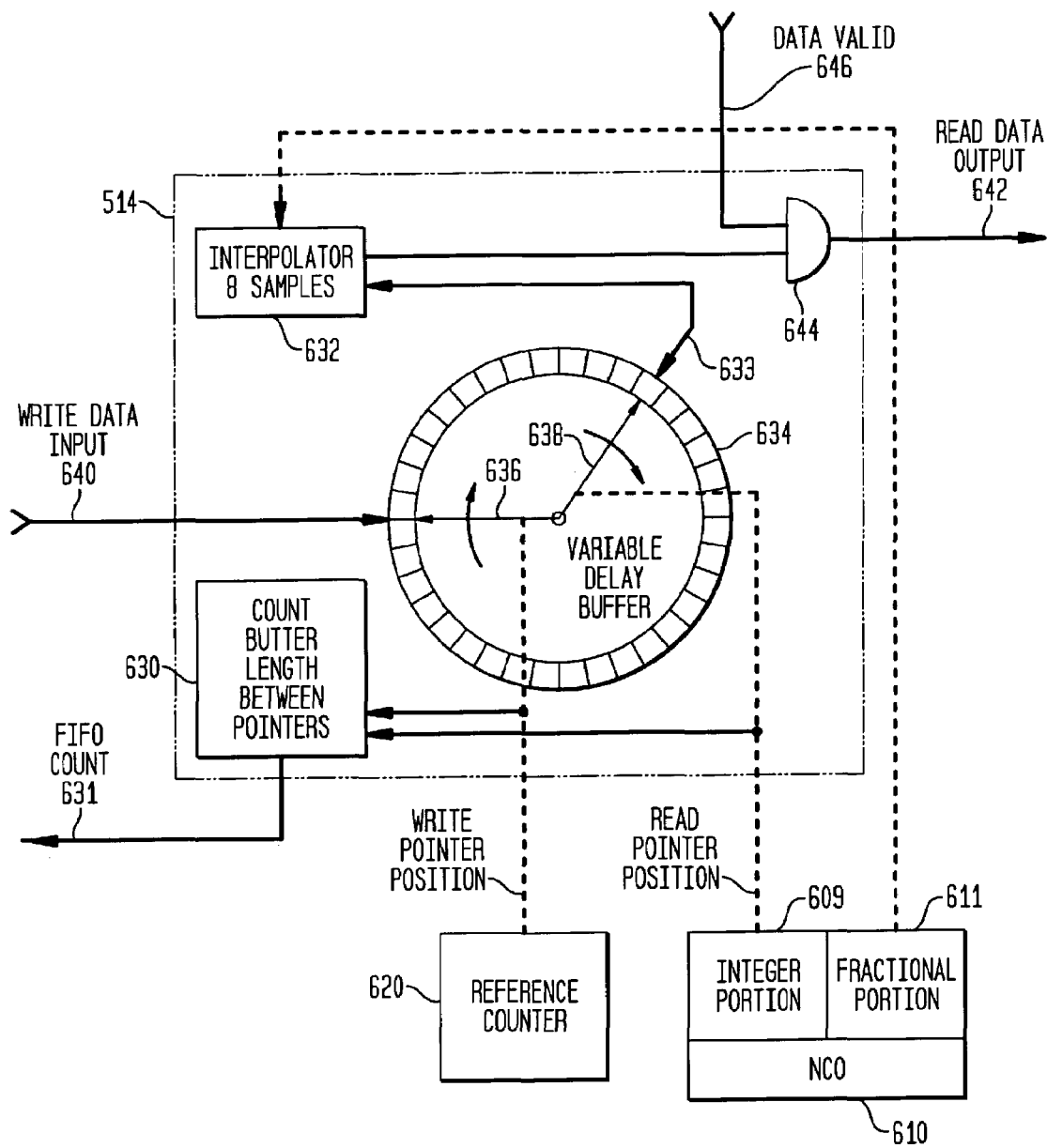
FIG. 6A is a block diagram of an interpolator/variable delay 514A, 514B in the joint timing loop for baud clock recovery of FIG. 6 for use in conjunction with the present invention.
Figure 6B:
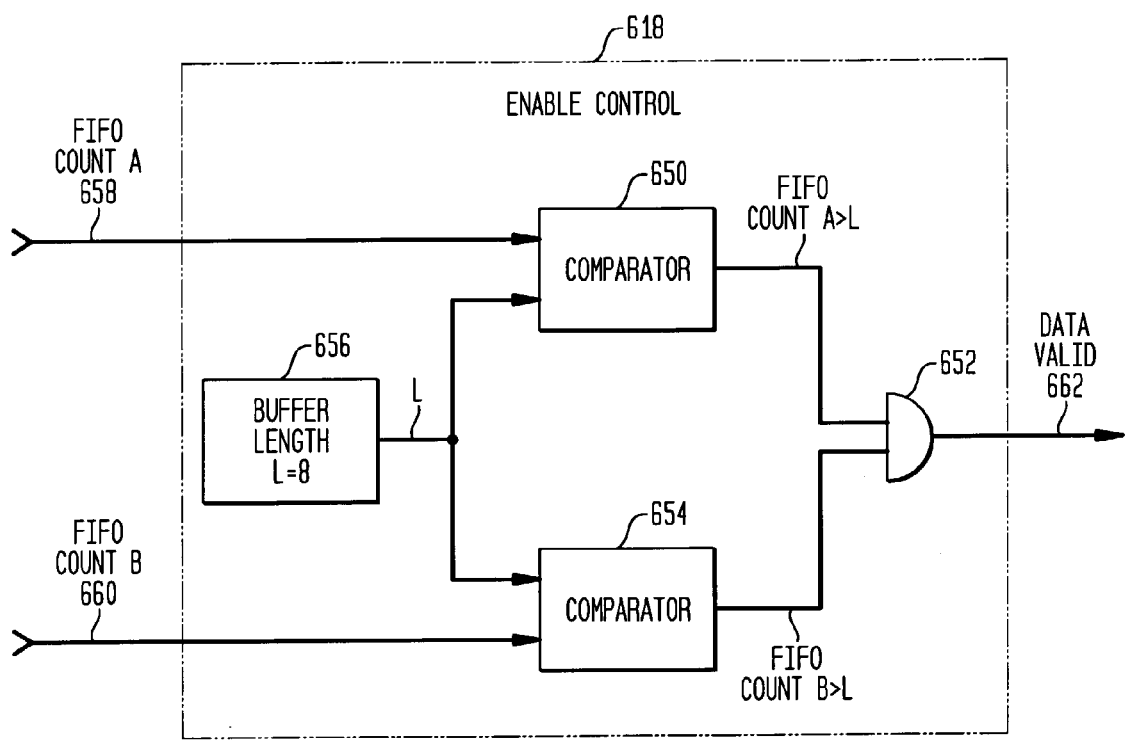
FIG. 6B is a block diagram of the enable control logic 618 in the joint timing loop for baud clock recovery of FIG. 6 for use in conjunction with the present invention.

Front End, Joint Timing Loop (Baud Clock Recovery)—FIGS. 6, 6A, 6B

The joint timing loop control 520 in FIG. 5 is shown in further detail in FIG. 6. The first interpolator/variable delay 514A and the first Matched filter/Pre filter element 516A in FIG. 6 correspond to the first receiver channel A. The second interpolator/variable delay 514B and the second Matched filter/Pre filter element 516B in FIG. 6 correspond to the second receiver channel B. The remainder of FIG. 6 within the dotted box 520 comprises the joint timing loop control 520 (from FIG. 5).

The joint timing loop control 520 comprises phase detectors 612A, 612B, NCO's 610A, 610B adders 622A, 622B, a joint loop filter 616, a skew corrector 614, a reference counter 620 and enable control logic 618. However, to better understand the operation of the joint timing loop control 520 in FIG. 6, it is useful to first consider the internal structure of the interpolator/variable delay 514A, 514B, which is illustrated in further detail in FIG. 6A.

In FIG. 6A, an interpolator/variable delay 514 includes a circular ring buffer 634, an 8-sample interpolator 632, a FIFO length counter 630 and an AND gate 644. The circular ring buffer 634 has a write pointer 636 and a read pointer 638. A write data input terminal 640 provides data values to be stored at the memory location defined by the write pointer 636 in the circular ring buffer. The data values 633 from the circular buffer 634 are input to the 8-sample interpolator 632, which computes an interpolated value over 8 samples, for output to be applied to one input of AND gate 644. The other input to AND gate 644 is data valid indication 646. When the data valid indication 646 is high, an interpolated value of data is read from the circular ring buffer 634 to the read data output 642.

The 8-sample interpolator uses 4 samples from the circular ring buffer 634 prior to the current read pointer position 638 and 4 samples from the circular ring buffer 634 subsequent to the current read pointer position 638. The interpolator 632 computes a current output value by interpolation over 8 samples. The interpolated output value is coupled via AND gate 644 to the read data output terminal 642.

The circular ring buffer 634 functions as a low-power, variable length, first in, first out (FIFO) buffer. The variable length FIFO is formed by the portion of the circular ring buffer between the read/write pointers 638 and 636. The length of the FIFO buffer thus is the number of memory locations between the write pointer 636 position and the read pointer 638 position. The dynamic FIFO buffer length is computed 630 and output as a FIFO count 631. The write pointer 636 is positioned by a write pointer position control, which is coupled to the output of a reference counter 620. The integer portion 609 of NCO 610 positions the read pointer 638.

The fractional portion 611 of the NCO 610 to the interpolator 632 represents the baud timing point between actual data samples. The fractional portion 611, is point at which the interpolated value over 8 samples is to be computed.

Returning to FIG. 6, the joint timing loop operates as follows: Reference counter 620 provides a constant sine/cosine output at a frequency slightly greater than the baud clock. The write pointers of both interpolator/variable delays 514A, 514B are driven from the reference counter 620 and are therefore locked in frequency and phase. All read and write pointers of both interpolator/variable delays 514A, 514B rotate in the clockwise direction. The read pointer of each circular buffer is controlled by the output of the respective NCO 610A, 610B. The read pointer of interpolator/variable delay 514A is driven from the integer portion of NCO 610A. In the other channel, the read pointer of interpolator/variable delay 514B is driven from the integer portion of NCO 610B. The fractional portion of NCO 610A is used to adjust the interpolation phase (i.e., the sub-sample delay) in interpolator/variable delay 514A. Similarly, the fractional portion of NCO 610B is used to adjust the interpolation phase (i.e., the sub-sample delay) in interpolator/variable delay 514B.

The joint timing loop control 520 operates in two distinct timed phases, termed part I an part II. In part I, the baud clock timing in the first channel A and the baud clock timing in second channel B are recovered to within one baud clock period. The variable delays 514A, 514B are adjusted to align the data in both channels with the respective baud clocks to within one baud clock period. However, the data in the first and second channels may still be skewed with respect to each other by one or more baud clock periods (i.e., shifted by one or more whole baud skews). In part II, the whole baud skew between baud clocks in channel A and channel B is determined. The variable delays 514A, 514B are then adjusted by the appropriate number of whole baud delays to align the data in both channels so as to eliminate the respective whole baud skew between channel A and channel B.

Joint Timing Loop—FIGS. 6, 6A, 6B—Part I

Baud Clock Recovery Using Interpolation and Skew within One Baud Clock Period

In operation in FIG. 6, a pair of cross coupled phase locked loops is used to recover the baud clock timing. Methods for recovering the baud clock timing in separate channels of a diversity receiver using separate phase locked loops are known. In FIG. 6, the phase locked loops are cross coupled by operation of the joint loop filter 616, which has been described above in conjunction with FIGS. 8A and 8B. Phase detector 612A (or 612B) is responsive to the Pf_pb_a (or Pf_pb_b) output of the Matched filter/Pre filter 516A, 516B to provide a measure of phase error to the joint loop filter 616. The output of the joint loop filter 616 controls NCO 610A, 610B via adder 622a, 622B. The NCO 610A, 610B responds to the closed loop input controls by adjusting the read pointer position of interpolator/variable delay 514A, 514B so as to minimize phase error to the phase detector 612A, 612B. An enable control 618 monitors the FIFO count A and FIFO count B from interpolator/variable delays 514A and 514B, and provides a data valid signal back to interpolator/variable delays 514A and 514B.

The enable control logic 618 is shown in further detail in FIG. 6B. The length of FIFO A and the length of FIFO B must each be greater than a minimum threshold in order for the data output of either circular buffer to be valid. The logic is carried out by comparing FIFO count A 658 to a buffer length of L=8 in a first comparator 650, and by comparing FIFO count B 660 to a buffer length of L=8 in a second comparator 654. If the FIFO count A is >L and FIFO count B is >L, then AND gate 652 output is high, indicating a data valid output 622.

Joint Timing Loop—FIGS. 6, 6A, 6B—Part II

Baud Clock Recovery Using Whole Baud Skew Correction

After a given time interval corresponding to a sufficiently large number of data samples, the PLL's for both channels tend to converge to a minimum phase error. At this point, the skew corrector 614 in the joint timing loop is enabled. The skew corrector 614 is responsive to the Matched filter/Pre filter 516A, 516B outputs Mf_pb_a and Mf_pb_b to compute a correlation function between the signals in the first and second channels of the diversity receiver. In response to correlation measurement, the skew corrector 614 injects whole baud time shifts into channel A and channel B by adding whole baud increments to the NCO 610A and/or NCO 610B via respective adders 622A and 622B.

Figure 9A:
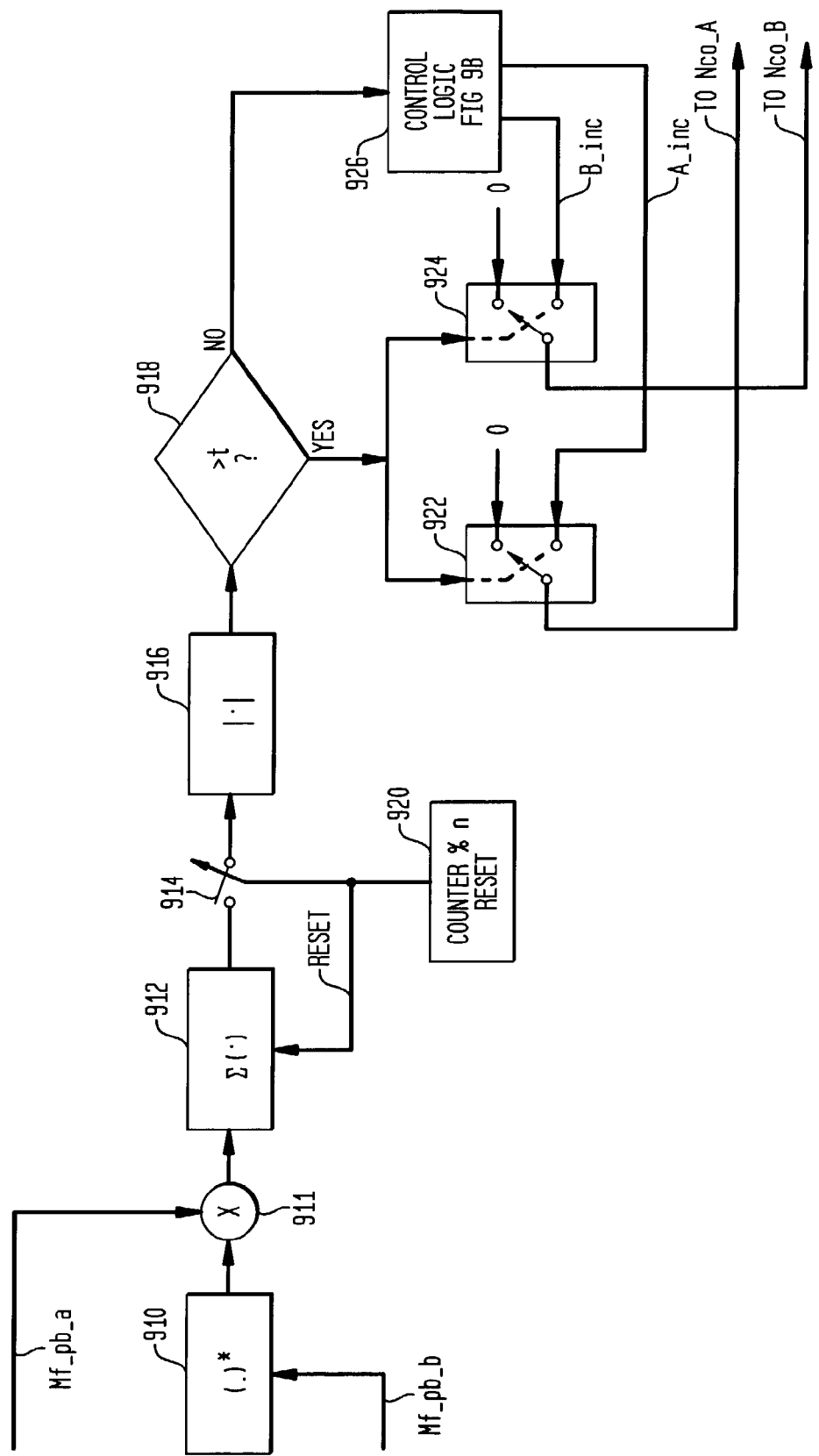
FIG. 9A is a block diagram partially in flow chart form of the skew corrector logic 614 in FIG. 6 in accordance with the present invention.
Figure 9C:
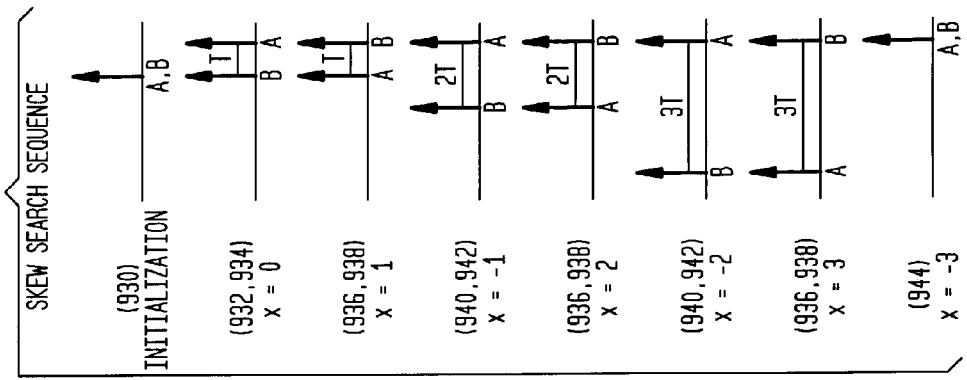
FIG. 9C is an illustration of time shift values for successive iterations for use in conjunction with skew correction the present invention.
Figure 9B:
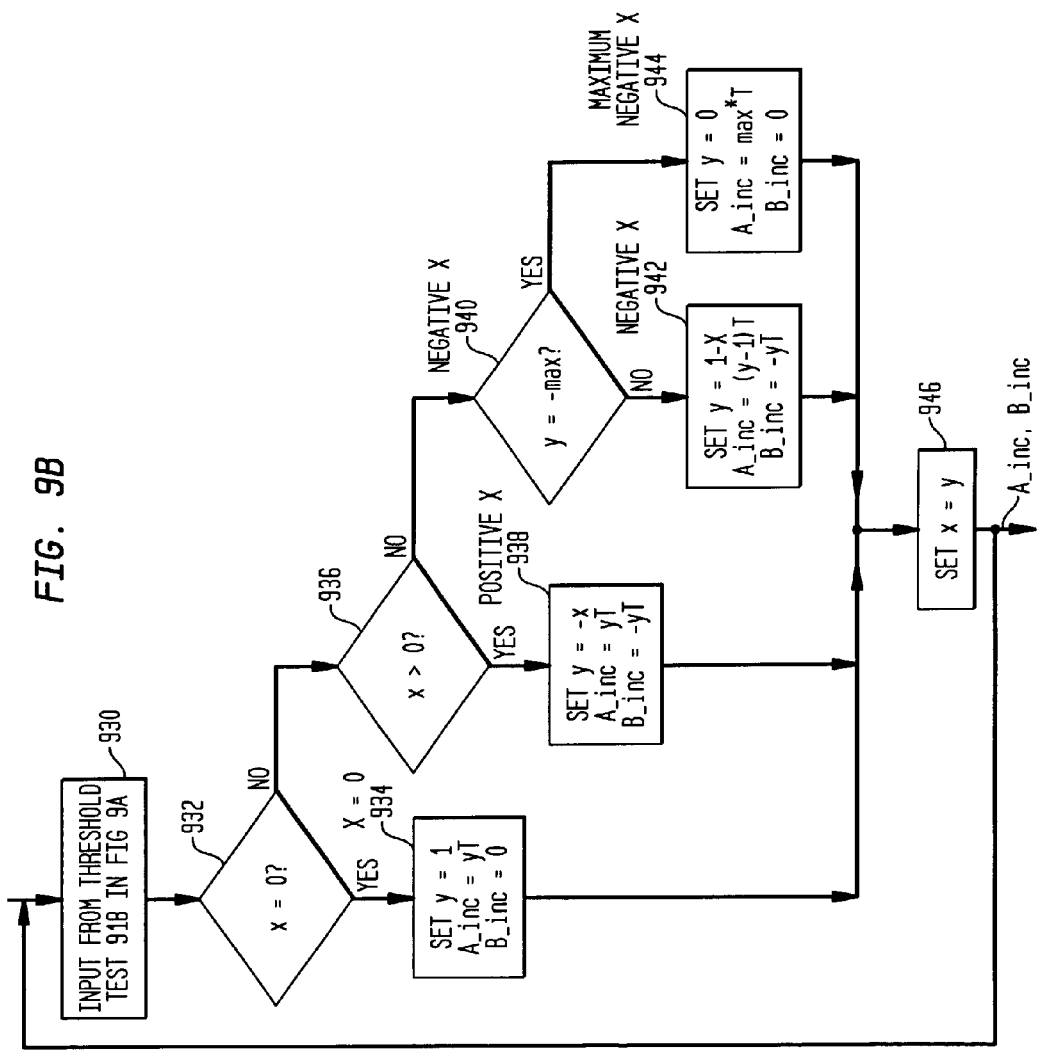
FIG. 9B is a flow chart diagram of the control logic 926 in FIG. 9A embodying the present invention.

The logic and flow diagrams for the whole baud skew corrector 614 in FIG. 6 is shown in FIGS. 9A and 9B. FIG. 9A illustrates the process by which the whole baud skew corrector computes the correlation between the output signals from the Matched filters, Mf_pb_a and Mf_pb_b, which correspond to the signals in channel A and channel B, respectively. First, the complex conjugate of Mf_pb_b is computed at step 910, and then multiplied by Mf_pb_a in multiplier 911. The result is integrated over a number of samples by integrator 912 and counter 920. Counter 920 periodically resets integrator 912 every n samples and closes switch 914. Thus, integrator 912 computes a numerical integration by summation over n samples, and presents the result to switch 914. The absolute value of the integral from step 912 is taken at step 916. The value at the output of step 916 represents the amount of correlation between input signals Mf_pb_a and Mf_pb_b.

The amount of correlation between the signal in channel A and the signal in channel B is then compared to a threshold value, t, at step 918. The signals in the first and second channels are supposed to be the same signal arriving through different antennas. Therefore, a high correlation value (> or =t) indicates that the signals in the first and second channels are properly aligned, and no further (whole baud) skew correction is needed. Switches 922 and 944 are responsive to a threshold decision 918 on correlation. Thus, switches 922 and 924, are responsive to a "yes" decision at step 918, to select "0" for the value of A_inc (channel A NCO increment) and "0" for the value of B_inc (channel B NCO increment). In other words, if the signal in channel A correlates highly (>t) with the signal in channel B, the skew corrector 614 in FIG. 6 provides no increment to adder, 622A, 622B, which does not introduce an increment to NCO 610A, 610B.

Referring back to FIG. 9A, if the correlation does not exceed the threshold t, then control logic 926 is activated to compute a value for the channel A, NCO increment, A_inc, and a value for the channel B, NCO increment, B_inc. A low correlation value (<t) indicates that the signals in the first and second channels are not properly aligned, and further (whole baud) skew correction is needed. Switches 922 and 924, are responsive to a "no" decision at step 918, to select the output of control logic 926 for the value of A_inc (channel A NCO increment) and also for the value of B_inc (channel B NCO increment). In other words, the skew corrector 614 in FIG. 6 provides first and second computed increments, A_inc, B_inc, to adders 622A and 622B, which introduces respective increments to NCO 610A and NCO 610B. The introduction of whole baud skews by the delay elements 514A and 514B changes the filter outputs, Mf_pb_a and Mf_pb_b to the skew corrector 614, which in turn computes new increments A_inc and B_inc. The process continues until a whole baud skew correction is found which provides acceptable correlation (>t) between the signals at the filter outputs, Mf_pb_a and Mf_pb_b.

A flow diagram for computing the value of A_inc and B_inc (by logic control 926 in FIG. 9A) is shown in FIG. 9B. The goal is to find values of A_inc and B_inc that result in a high correlation between Mf_pb_a and Mf_pb_b. Small skews, both plus and minus, are searched first. The search strategy is based on the assumption that channel A and channel B are more likely to be skewed by a smaller amount than by a larger amount. That is, 0 skew is more likely than plus or minus 1 baud skew, which is more likely than plus or minus 2 whole baud skews, etc. Search is performed by enumeration in the following order: 0 skew, +1 skew, −1 skew, +2 skew, −2 skew, +3 skew, −3 skew and so on up to a maximum skew (the extreme end of the adjustment range).

FIGS. 9B and 9C illustrate the skew search sequence. Parameter T is the time interval corresponding to one baud skew. Variables x and y are internal program states, where x is the previous value of baud shift and y is the current value of the baud shift. Initially x and y are set to zero.

The initialization condition for zero skew where no NCO increment is introduced into either channel A or channel B, is shown in the initialization skew chart. The initialization condition corresponds to the initial state at the entry step 930 (from comparator test step 918 in FIG. 9A). Positive values for x are shown in the skew graphs for x=1, x=2, x=3 in FIG. 9C, and correspond to steps 936 and 938 in FIG. 9B. Negative values for x are shown in the skew graphs for x=−1, x=−2, in FIG. 9C, and correspond to steps 940 and 942 in FIG. 9B. The maximum negative value for x is shown in the skew graph for x=−3 in FIG. 9C, and corresponds to step 944 in FIG. 9B.

In operation, after the initialization entry step 930, x is compared to zero at step 932. On the first pass, x is 0, so that step 934 sets A_inc to 1 and B_inc to 0. The system state at this step corresponds to x=0 in FIG. 9C. Upon exit step 946, x is set to the current value of y, which is equal to 1. On the second pass, x is not zero at step 932, so test step 936 is entered. Step 936 tests for polarity. For positive polarity of x, step 938 sets y equal to −x, and changes A_inc, and B_inc to yT and −yT, respectively. Upon exit step 946, x is set to y, which is now equal −1. On the third pass, x is not zero at step 932, so a polarity test step 936 is entered. Now x is negative, so step 940 is performed. Step 940 tests for the maximum negative skew (extreme end of the adjustment range). If skew is not maximum negative, step 942 is performed (setting y to 1−x, and setting A_inc, and B_inc to (y−1)T and −yT, respectively), otherwise step 944 is performed. At each time upon exit step 946, a new value for x (previous value of skew shift) is set equal to y (current value of skew shift), and updated values of A_inc, and B_inc are generated.

Thus, by operation of the flow chart in FIG. 9B, after 0 skew is tested (initialization), +1 skew is tested. Then −1 skew is tested, and then +2, −2, +3 and −3 in that order. The FIG. 9C graph for x=0 shows channel A advanced one baud skew relative to channel B. The graph for x=1 shows channel B advanced one baud skew relative to channel A. The graph for x=−1 shows channel A advanced two baud skews relative to channel B. The graph for x=+2 shows channel B advanced two baud skews relative to channel A. Finally, the graph for x=−2 shows channel A advanced three baud skews relative to channel B. The graph for x=+3 shows channel B advanced three baud skews relative to channel A. For x=−3, channel A and channel B are both advanced one baud skew.

An alternative embodiment for the search strategy is to search starting from an extreme end of the adjustable range such as −3 skew and search linearly across the range as follows: −3 skew, <2 skew, −1 skew, 0 skew+1 skew, +2 skew and +3 skew. Another embodiment is to search from 0 skew, to one extreme end of the range and then reverse and search to the other extreme end of the range. Although the latter test duplicates computations, programming code may be more compact and easier to implement. The additional computation burden for whole baud skew correction is slight since the whole baud skew calculation is performed primarily on receiver's initial adaptation sequences. Once adjusted for whole baud skews, the whole baud clock timing is not likely to change for a given antenna location.

As indicated, the recovered baud clock represents the timing signal for sampling the received signal to recover digital data. The recovered baud clock timing typically does not fall exactly on one of the sampled values of the received signal. A sampled value of each received signal corresponding to the recovered baud clock timing is computed using an interpolator (632 in FIG. 6A). The interpolator computes the desired sampled data value by using earlier and later actual samples of the received signal. The received signal samples are interpolated over 8 signal samples (4 samples after and 4 samples before the current baud clock time).

Joint Front End, Joint Pilot Loop

Figure 7:
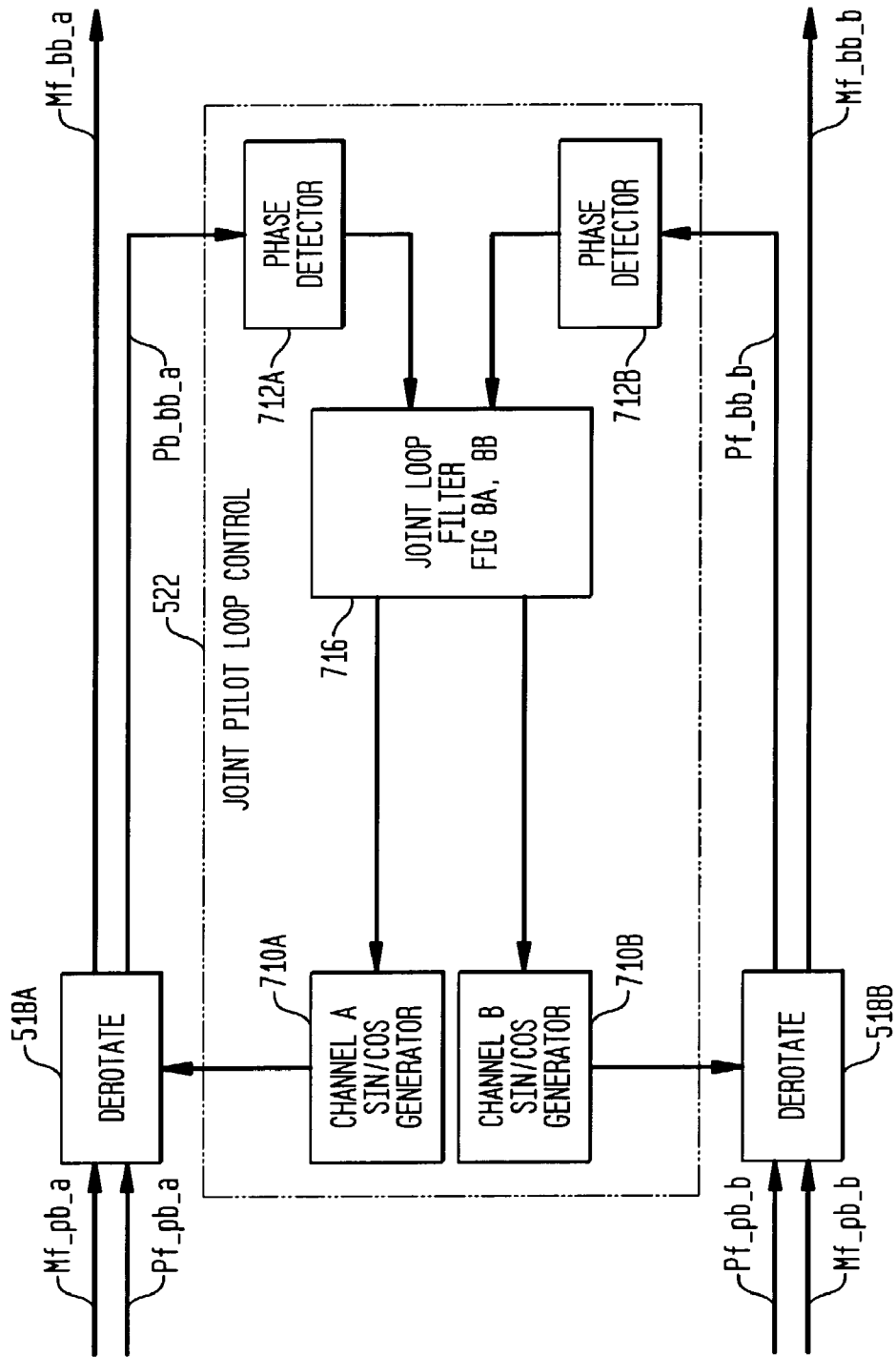
FIG. 7 is a block diagram of a joint pilot loop for RF carrier recovery for use in a multiple channel diversity receiver in accordance with the present invention.

RF Carrier Recovery—FIGS. 5 and 7

After the baud clock is recovered in the joint timing loop 510 of FIG. 5, the joint pilot loop 512 recovers the carrier signal which is used to demodulate (derotate) each of the signals received in channel A and channel B. The carrier signals for channel A and channel B are recovered by jointly processing signals from both channel A and channel B in the joint pilot loop control 522. Further details of the joint pilot loop 512 are shown in FIG. 7.

The joint pilot loop control 522 comprises phase detectors 712A, 712B, sine/cosine generators 710A, 710B, and a joint loop filter 716. A sine/cosine generator is similar to a numerically controlled oscillator (NCO) in that both are responsive to a numerical input to generate the frequency and phase of an output signal. The difference is in the implementation methodology, in that a sine/cosine generator calculates output values of a desired sinusoidal function, while an NCO counts time intervals.

In operation, a pair of cross coupled phase locked loops is used to recover the carrier clock. The phase locked loops are cross coupled by operation of the joint loop filter 716, which has been described above in conjunction with FIGS. 8A and 8B. For each of channel A and B, a phase detector 712A (712B) is responsive to the Pf_bb_a (or Pf_bb_b) output of the Matched filter/Pre filter 516A (516B) to provide a measure of phase error to the joint loop filter 716. The output of the joint loop filter 716 controls sine/cosine generator 710A (710B). The sine/cosine generator 710A (710B) responds to the closed loop input controls by adjusting its output signal so as to reduce the phase error to the phase detector 712A (712B). The changed phase error in the derotator 518A (518B) output is measured by the phase detector 712A (712B), which changes the input to the loop filter 716. The closed loop process continues until the PLL converges (and locks) to a stable state reducing (and keeping) the phase error to an acceptably low value. The derotated outputs for channel A and channel B, Mf_bb_a, and Mf_bb_b, are input to the joint equalizer.

Forward Equalization

Figure 10:
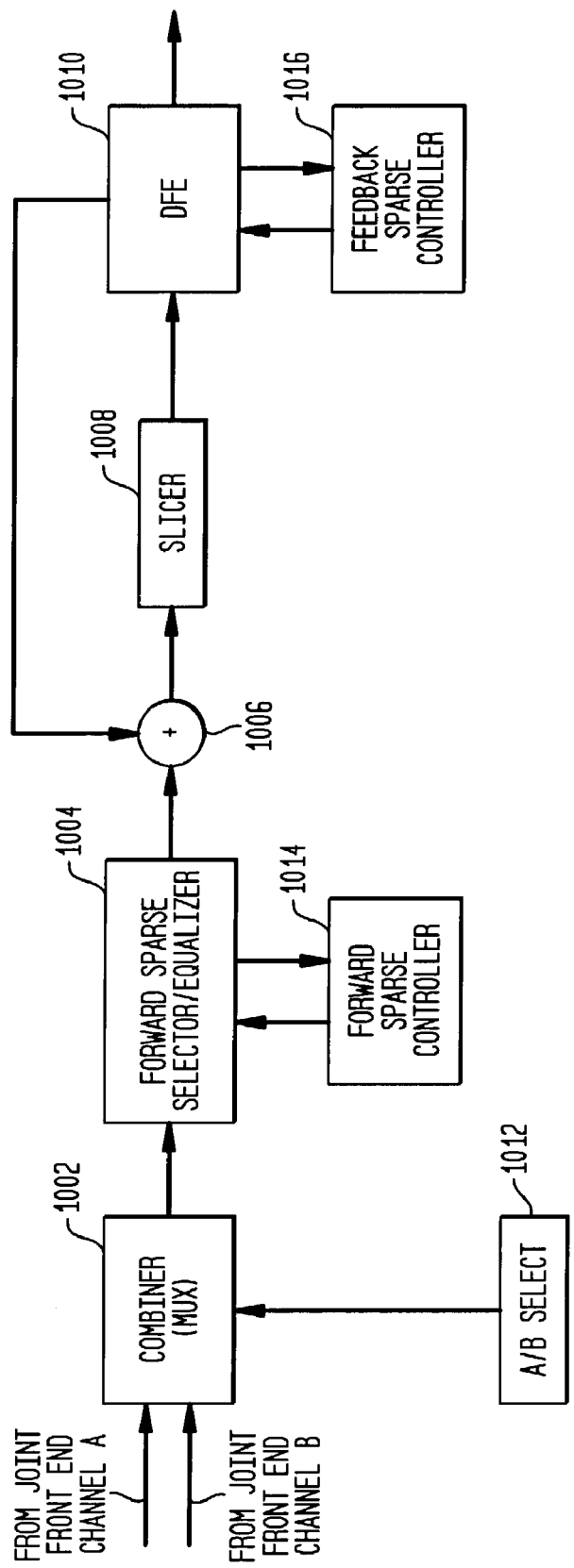
FIG. 10 is a block diagram of a forward equalizer with dynamic tap allocation in accordance with the present invention.

A further aspect of the diversity receiver of the present invention is the use of sparse equalization to determine the optimum coefficients for both blind and decision directed modes. A joint equalizer having both forward and feedback portions is shown in FIG. 10. An equalization filter technique for use with the present joint equalizer is found in copending patent application Ser. No. 09/100,705, filed Jun. 19, 1998, entitled "REDUCED COMPLEXITY BLIND EQUALIZER FOR DUAL MODE (QAM/VSB) SIGNALLING", and assigned to assignee of the present application. The disclosed equalizer of the above cited patent application discloses a technique of "sparse equalization" in which an equalizer is formed using a "sparse equalization filter".

Briefly, in the above cited sparse equalizer patent application, only 32 out of 256 taps of an equalization filter are used. The equalization technique is termed "sparse" because only the most significant 32 filter taps are used and the remaining filter taps are set to zero. That is, the 224 smallest filter coefficients are set to zero, leaving only the 32 most significant filter coefficients remaining non-zero.

To find the 32 most significant coefficients out of the total 256 taps, the first 32 coefficients are calculated for taps 0 to 31 (forming a first set of 32 taps). Then, the smallest of the 32 coefficients is set to zero (leaving 31 non-zero taps), and a coefficient value for tap 32 is calculated (creating a second set of 32 taps). The smallest coefficient among the second set of 32 taps is then set to zero, and a coefficient for tap 33 is calculated (creating a new third set of 32 taps). The process is repeated until the most significant 32 taps are allocated (selected) among the 256 total taps.

In the above cited patent application, the sparse equalization technique is used to improve operational speed by reducing the number of necessary calculations in order to adjust the equalization filter coefficients. In the present application, the sparse equalization is used to dynamically allocate equalization filter taps among first and second channels of a diversity receiver.

The joint forward equalizer in FIG. 10 comprises combiner 1002, A/B selector 1012, forward spare selector/equalizer 1004 and forward sparse controller 1014, which form the forward equalizer portion of the joint equalizer. The joint forward equalizer further comprises a feedback equalizer portion formed by adder 1006, slicer 1008, decision feedback equalizer filter (DFE) 1010 and feedback sparse controller 1016.

In operation, the output of the front end of channels A and B are input to the combiner 1002 which multiplexes one sample from each joint front end under the control of the A/B selector 1012. One sample from channel A is alternated with one sample from channel B and the multiplexed result is input to the joint forward sparse selector/equalizer 1004.

The data stream derived from the multiplexed channel A and channel B signals at the output of the forward sparse selector/equalizer 1004 are input to adder 1006. The output from adder 1006 goes to the slicer 1008, which makes a hard decision of the data symbol value by comparison of the input signal to an internal reference level. After the slicer 1008 output, the hard decision values are coupled to a decision feedback equalization filter (DFE) 1010 that is further coupled to the adder 1006 in a feedback loop. In a manner similar to tap allocation scheme for the forward sparse selector/equalizer 1004, the DFE filter 1010 is coupled to the feedback sparse controller 1016, which allocates 32 taps out of 256 taps of the DFE filter 1010.

Under ideal channel conditions, in which both channels A and B are exactly the same (i.e., no differences due to multiple signal paths) a tap allocation equalizer should use equal amounts from each channel by splitting the two center tap values equally to 0.5 and 0.5. Under real channel conditions, the equalizer combines the two channels in inverse proportion to the MSE error (mean square error) in each channel where the coefficients for each respective channel will be distributed along the respective channel's tapped delay line. In accordance with the present invention, since the samples from channel A and channel B are interleaved, the operation of the sparse equalizer is to effectively allocate taps between the equalizer for channel A the equalizer for channel B, in both blind and decision directed modes. The multiple channels are combined into one tapped delay line and the sparse equalization technique selects tap weights without bias.

While the foregoing embodiment of a multiple channel diversity receiver illustrates a two channel diversity receiver having two antennas, the invention described herein is generally applicable to a multiple channel diversity receiver having three or more antennas with joint signal processing.

What is claimed is:

1. In a diversity receiver having first and second channels with respective first and second tuners, each of said first and second tuners having a respective tuner output terminal, said first tuner further having a first AGC control input terminal, and said second tuner further having a second AGC control input terminal, said diversity receiver including a joint AGC circuit shared between said first and second tuners, said joint AGC circuit comprising:
 a first signal level sensing circuit coupled to receive the signal output from said first tuner at the output terminal of said first tuner;
 a second signal level sensing circuit coupled to receive the signal output from said second tuner at the output terminal of said second tuner;
 a first AGC circuit coupled to said first and second signal level sensing circuits and to said first AGC control input terminal, said first AGC circuit being responsive to said first and second signal level sensing circuits to generate a first AGC control signal at the first AGC control input terminal of said first tuner, wherein said joint AGC circuit further comprises:
 a second AGC circuit coupled to said first and second signal level sensing circuits and to said second AGC control input terminal, said second AGC circuit being responsive to said first and second signal level sensing circuits to generate a second AGC control signal at the second AGC control input terminal of said second tuner, wherein said joint AGC circuit limits the maximum difference between said first AGC control signal at the first AGC control input terminal of said first tuner, and said second AGC control signal at the second AGC control input terminal of said second tuner, to a predetermined maximum difference.

2. A diversity receiver in accordance with claim 1, wherein said first AGC control input terminal is an RF AGC control input terminal, and said first tuner has a first IF AGC control input terminal, wherein said joint AGC circuit further comprises a splitter responsive to said first AGC control signal to divide said first AGC control signal into an RF AGC control signal coupled to said RF AGC control input terminal and an IF AGC control signal coupled to said first IF AGC control input terminal.

3. In a diversity receiver having first and second channels with respective first and second tuners, each of said first and second tuners having a respective second tuner further having a second AGC control input terminal, a joint AGC method comprising:
 sensing a first signal level at the output terminal of said first tuner to provide a first sensed signal level;
 sensing a second signal level at the output terminal of said second tuner to provide a second sensed signal level;
 generating a first AGC control signal responsive to said first sensed signal level and said second sensed signal level; and
 coupling said first AGC control signal to said first AGC control input terminal of said first tuner, wherein said joint AGC method further comprises:
 generating a second AGC control signal responsive to said first sensed signal level and said second sensed signal level; and
 coupling said second AGC control signal to said second AGC control input terminal of said second tuner, wherein said joint AGC method further includes:
 limiting the maximum difference between said first AGC control signal and said second AGC control signal to a predetermined maximum difference.

4. A joint AGC method in accordance with claim 3, wherein said first AGC control input terminal is a first RF AGC control input terminal, and said first tuner has a first IF AGC control input terminal, said joint AGC method further comprising:
 splitting, said first AGC control signal into an RF AGC control signal and an IF AGC control signal;
 coupling said RE AGC control signal to said first RF AGC control input terminal; and
 coupling said IF AGC control signal to said first IF AGC control input terminal.

* * * * *